United States Patent
Lee et al.

(10) Patent No.: US 9,140,917 B2
(45) Date of Patent: Sep. 22, 2015

(54) METHOD OF FORMING STRUCTURE INCLUDING MICROPATTERN, METHOD OF FORMING NANOPATTERN, AND METHOD OF MANUFACTURING DISPLAY PANEL FOR LIQUID CRYSTAL DISPLAY

(71) Applicant: Samsung Display Co., Ltd., Yongin, Gyeonggi-Do (KR)

(72) Inventors: Su Mi Lee, Hwaseong-si (KR); Min Hyuck Kang, Seoul (KR); Myung Im Kim, Suwon-si (KR); Tae Woo Kim, Seoul (KR); Seung-Won Park, Seoul (KR); Xie Lei, Suwon-si (KR); Moon Gyu Lee, Suwon-si (KR)

(73) Assignee: Samsung Display Co., Ltd. (KR)

( * ) Notice: Subject to any disclaimer, the term of this patent is extended or adjusted under 35 U.S.C. 154(b) by 112 days.

(21) Appl. No.: 14/108,761

(22) Filed: Dec. 17, 2013

(65) Prior Publication Data

US 2015/0038044 A1   Feb. 5, 2015

(30) Foreign Application Priority Data

Aug. 1, 2013   (KR) .................. 10-2013-0091573

(51) Int. Cl.
  *G02F 1/155*   (2006.01)
  *G02F 1/1333*   (2006.01)
  *G02F 1/1335*   (2006.01)

(52) U.S. Cl.
  CPC ........ *G02F 1/1333* (2013.01); *G02F 1/133528* (2013.01); *G02F 1/133553* (2013.01); *G02F 1/155* (2013.01)

(58) Field of Classification Search
  CPC ........... G02F 1/155; G02F 1/15; G02F 1/153; G02F 1/1333; G02F 1/133553; G02F 1/133528
  See application file for complete search history.

(56) References Cited

U.S. PATENT DOCUMENTS

| 7,012,280 | B2 | 3/2006 | Kim et al. | |
|---|---|---|---|---|
| 7,244,677 | B2 | 7/2007 | Ritzdorf et al. | |
| 7,365,005 | B1 | 4/2008 | Gadgil | |
| 8,012,872 | B2 | 9/2011 | Nguyen Hoang et al. | |
| 2007/0146592 | A1* | 6/2007 | Kimura | 349/114 |
| 2009/0127563 | A1* | 5/2009 | Bae et al. | 257/72 |
| 2009/0236627 | A1 | 9/2009 | Kim et al. | |
| 2010/0149481 | A1* | 6/2010 | Lee et al. | 349/187 |
| 2011/0151678 | A1 | 6/2011 | Ashtiani et al. | |
| 2012/0248442 | A1* | 10/2012 | Yu et al. | 257/49 |
| 2012/0315715 | A1* | 12/2012 | Cho et al. | 438/30 |

FOREIGN PATENT DOCUMENTS

| KR | 10-2008-0057412 A | 6/2008 |
|---|---|---|
| KR | 10-2011-0101893 A | 9/2011 |

* cited by examiner

*Primary Examiner* — Anne Hines
(74) *Attorney, Agent, or Firm* — Innovation Counsel LLP

(57) ABSTRACT

A method of forming a micropattern structure includes: coating a structure including a plurality of guide blocks extending in a first direction on a substrate and disposed to be spaced apart from each other in a second direction, which is perpendicular to the first direction, with a sacrificial material; ashing a portion of the sacrificial material to expose upper portions of the plurality of guide blocks; coating the structure with a first material having a polarity that is contrary to a polarity of a filling material filling the structure; heat-treating the structure to chemically bond the first material to the upper portions of the plurality of guide blocks; removing the sacrificial material and excess first material to form a first material cap chemically bonded to the upper portions of the plurality of guide blocks; and filling the structure with the filling material.

18 Claims, 11 Drawing Sheets

METHOD OF FORMING STRUCTURE INCLUDING MICROPATTERN, METHOD OF FORMING NANOPATTERN, AND METHOD OF MANUFACTURING DISPLAY PANEL FOR LIQUID CRYSTAL DISPLAY

CROSS-REFERENCE TO RELATED APPLICATION

This application claims priority to and the benefit of Korean Patent Application No. 10-2013-0091573 filed in the Korean Intellectual Property Office on Aug. 1, 2013, the entire contents of which are incorporated herein by reference.

BACKGROUND (a) Field

A method of forming a micropattern structure, a method of forming a nanopattern, and a method of manufacturing a display panel for a liquid crystal display, and more particularly, to a method of forming a micropattern structure, in which protrusions and depressions are not formed in a material filling an inside of the micropattern structure, a method of forming a nanopattern, and a method of manufacturing a display panel for a liquid crystal display are provided.

(b) Description of the Related Art

A micropattern structure is a structure that includes a micropattern, for example, a trench of about 1 μm. To fill a micropattern structure with a filling material, the filling material is typically applied along an upper portion of such a micropattern. However, frequently the filling material partially remains on the upper portion of the trench micropattern, and significant protrusions and depressions (meniscus) are formed in the filling material that is filled into the trench. Thus, the filling material is not filled into the micropattern such that it is level across the top surface of the filling material on the micropattern.

In order to fill the filling material into the structure so that it is level across the top surface of the filling material on the micropattern, after the filling material is applied in a thickness that is larger than a depth of the trench, the filling material may be etched to have the thickness that is the same as the depth of the trench. In this case, the filling material may have a level top surface, but there is a problem in that the thickness of the filling material is always the same as the depth of the trench. That is, the filling material cannot be filled to a desired thickness in the micropattern structure and also be level within the structure.

Moreover, the filling material that fills the inside of the micropattern structure may be degenerated by an etching process, and there may occur a problem in a post-process by the degeneration.

The above information disclosed in this Background section is only for enhancement of understanding of the background of the disclosure and therefore it may contain information that does not form the prior art that is already known to a person of ordinary skill in the art.

SUMMARY

A method of forming and filling a micropattern structure, in which a filling material is filled in a desired thickness in the micropattern structure and has a level top surface, a method of forming a nanopattern, and a method of manufacturing a display panel for a liquid crystal display.

A method of forming a micropattern structure, includes: coating a structure including a plurality of guide blocks extending in a first direction on a substrate and disposed to be spaced apart from each other in a second direction, which is perpendicular to the first direction, with a sacrificial material; ashing a portion of the sacrificial material to expose upper portions of the plurality of guide blocks; coating the structure with a first material having a polarity that is contrary to a polarity of a filling material filling the structure; heat-treating the structure to chemically bond the first material to the upper portions of the plurality of guide blocks; removing the sacrificial material and excess first material to form a first material cap chemically bonded to the upper portions of the plurality of guide blocks; and filling the structure with the filling material.

The sacrificial material may include an organic compound dissolved in a solvent.

The ashing of the portion of the sacrificial material to expose the upper portions of the plurality of guide blocks may include: determining a predetermined thickness of the filling material; determining an upper depth to expose the plurality of guide blocks based on the predetermined thickness of the filling material; and exposing the upper portions of the plurality of guide blocks to the upper depth.

The first material may include a hydrophobic material.

The hydrophobic material may be any one of $RSi(OR')_3$ and $RPO(OH)$, R may be an aliphatic alkyl group, and R' may be a methyl group or an ethyl group.

The removing of the sacrificial material and excess hydrophobic material to form the first material cap chemically bonded to the upper portions of the plurality of guide blocks may include: performing a first washing using a first organic solvent to remove the hydrophobic material; and performing second washing using a second organic solvent to remove the sacrificial material.

The filling of the structure with the filling material may include filling the filling material between the plurality of guide blocks to the predetermined thickness of the filling material.

The filling material may include a block copolymer.

The method may further include heat-treating the structure filled with the filling material including the block copolymer.

The heat-treating of the structure, filled with the filling material including the block copolymer, to phase separate the filling material including the block copolymer into a first block and a second block in the second direction while the filling material is aligned in the first direction.

The method may further include selectively removing any one of the first block and the second block to form a nanopattern.

In another aspect, a method of forming a nanopattern, includes: filling a filling material including a block copolymer in a micropattern structure, the micropattern structure including a plurality of guide blocks disposed on a substrate and having upper portions opposite the substrate, wherein the upper portions are surrounded by a hydrophobic material cap to a predetermined upper depth; heat-treating the micropattern structure filled with the filling material including the block copolymer to phase separate the filling material including the block copolymer into a first block and a second block in a second direction while the filling material is aligned in a first direction; and selectively removing any one of the first block and the second block to form a nanopattern The plurality of guide blocks may extend in the first direction on the substrate and may be disposed to be spaced apart from each other in the second direction that is perpendicular to the first direction.

The filling of the filling material including the block copolymer in the micropattern structure may include filling the filling material into the micropattern structure to a thickness of the filling material determined to correspond to a depth from the predetermined upper depth to the substrate, and an upper surface of the filling material at the predetermined upper depth is level.

In another aspect, a method of manufacturing a display panel for a liquid crystal display, includes: forming a metal layer on a first insulation substrate; forming a plurality of guide blocks on the metal layer; coating the first insulation substrate, on which the plurality of guide blocks are formed, with a sacrificial material; ashing a portion of the sacrificial material to expose upper portions of the plurality of guide blocks; coating the first insulation substrate, on which the upper portions of the plurality of guide blocks are exposed, with a hydrophobic material; heat-treating the first insulation substrate to chemically bond the hydrophobic material to the upper portions of the plurality of guide blocks; removing the sacrificial material and excess hydrophobic material to form a hydrophobic material cap chemically bonded to the upper portions of the plurality of guide blocks; filling a filling material including a block copolymer between the plurality of guide blocks; heat-treating the first insulation substrate filled with the filling material to form a nanopattern; and etching the metal layer by using the nanopattern as a mask to form an optical conversion layer.

The plurality of guide blocks may extend in a first direction and may be spaced apart from each other in a second direction that is perpendicular to the first direction, and the filling material including the block copolymer may undergo a phase separation into a first block and a second block in the second direction while being aligned in the first direction.

The heat-treating of the first insulation substrate filled with the filling material to form the nanopattern may include selectively removing any one of the first block and the second block.

The optical conversion layer may include a reflection portion reflecting incident light and a polarization portion through which light vibrated in the first direction is transmitted, and the plurality of guide blocks may be formed at a position corresponding to the polarization portion.

The filling material can be filled in a desired thickness in the micropattern structure so that it is level across the top surface of the filling material. Further, because an etching process is not used for forming the level filling of the filling material in the micropattern structure, it is possible to solve a problem in that the filling material is degenerated by the etching process.

DETAILED DESCRIPTION

Figure 1:
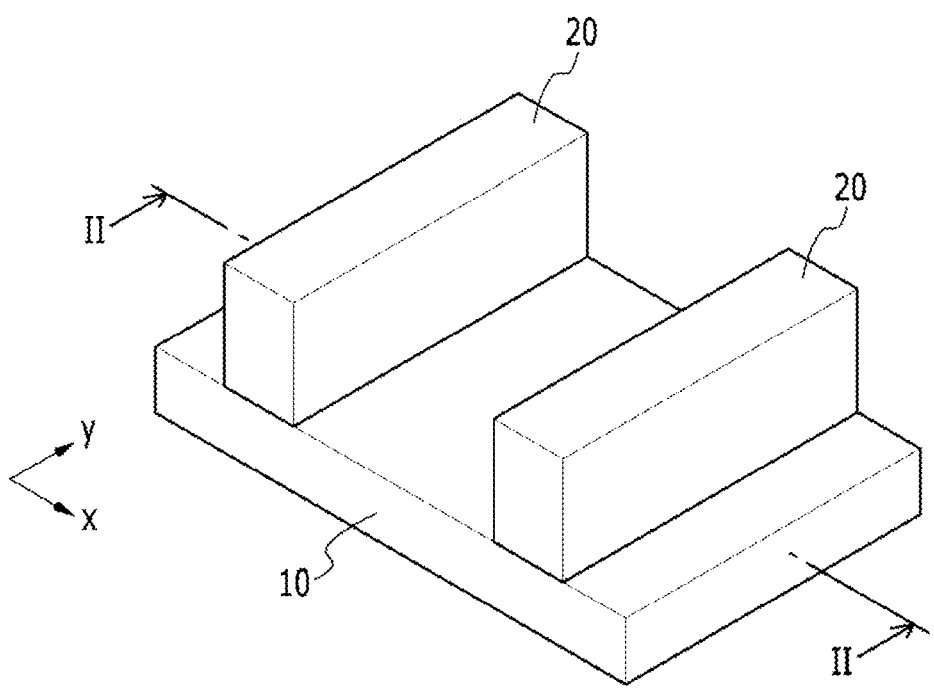
FIG. 1 is a perspective view schematically illustrating a micropattern micropattern structure according to an example.

Hereinafter, example embodiments will be described in detail with reference to the accompanying drawings so that those skilled in the relevant art may practice the present invention. As those skilled in the relevant art would realize, the described embodiments may be modified in various different ways, all without departing from the spirit or scope of the present invention.

In addition, in various example embodiments, the same reference numerals are used in respects to the constituent elements having the same constitution and illustrated in the first example embodiment, and in the other example embodiments, only elements that are different from the first exemplary embodiment are illustrated.

In describing the present disclosure, parts that are not related to the description will be omitted.

In the drawings, the thickness of layers, films, panels, regions, etc., are exaggerated for clarity. It will be understood that when an element such as a layer, film, region, or substrate is referred to as being "on" another element, it can be directly on the other element, or intervening elements may also be present. In contrast, when an element is referred to as being "directly on" another element, there are no intervening elements present.

Figure 2:
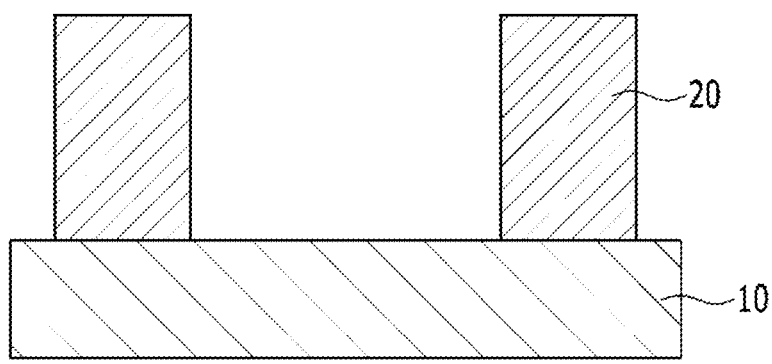
FIG. 2 is a cross-sectional view of the micropattern structure of FIG. 1.

FIG. 1 is a perspective view schematically illustrating a micropattern structure according to an example embodiment. FIG. 2 is a cross-sectional view of the micropattern structure of FIG. 1.

Referring to FIGS. 1 and 2, the micropattern structure includes a plurality of guide blocks 20 formed on a substrate 10. The plurality of guide blocks 20 extend in a first direction y and are disposed to be spaced apart from each other in a second direction x that is perpendicular to the first direction y. A distance between the plurality of guide blocks 20 may be, for example, about 10 μm.

The substrate 10 may be made of a material such as, for example, glass, plastic, or ceramics such as $Al_2O_3$. The guide block 20 may be made of the same material as the material used in the substrate 10, or from a material that is different from the material used in the substrate 10. For example, the guide block 20 may be made of a material such as silicon oxide ($SiO_2$) or silicon nitride (SiNx).

The guide block 20 may be formed by etching into a substrate 10. In such case, the guide block 20 may be formed by forming a photosensitive film on the substrate 10, exposing and developing the photosensitive film by using a predefined mask to form a photosensitive film pattern through which a predetermined region of the substrate 10 is exposed, and etching the substrate 10 by an etching process using the photosensitive film pattern as a mask by a predetermined depth to form a trench, which is the region between two guide blocks 20. In this case, the substrate 10 and the guide block 20 are made of the same material.

Alternatively, the guide blocks 20 may be made from a different material from the substrate 10. In such a case, guide blocks 20 may be formed on the substrate 10 by forming an insulating layer for forming the guide block 20 on the substrate 10, forming the photosensitive film on the insulating layer, exposing and developing the photosensitive film by using a predefined mask to form the photosensitive film pattern through which a predetermined region of the insulating layer is exposed, and etching the insulating layer by the etching process using the photosensitive film pattern as the mask. An inorganic insulating layer such as, for example, silicon oxide ($SiO_2$) or silicon nitride (SiNx) may be used as the insulating layer. Alternatively, as the insulating layer, an organic insulating layer such as, for example, a cellulose derivative, an olefin-based resin, an acryl-based resin, a vinyl chloride-based resin, a styrene-based resin, a polyester-based resin, a polyamide-based resin, a polycarbonate-based resin, a polycycloolefin resin, or an epoxy resin may be used.

A method of forming a micropattern structure will be described with reference to FIGS. 3 to 7.

FIGS. 3 to 7 are process cross-sectional views for illustrating the method of forming a micropattern structure by filling an inside of the micropattern structure with a desired material according to an exemplary embodiment.

Figure 3:
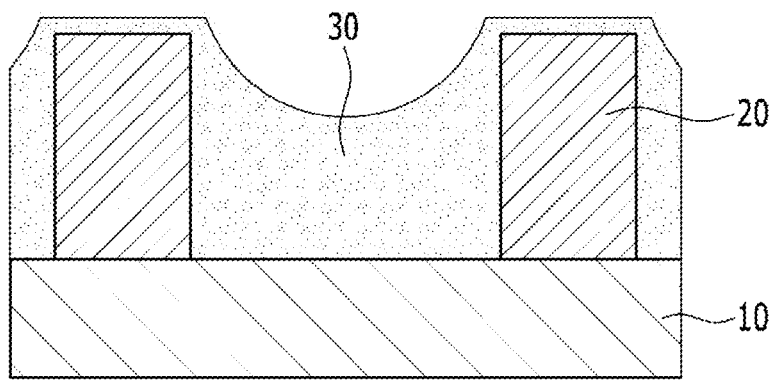
FIGS. 3 to 7 are process cross-sectional views illustrating a method of forming the micropattern structure by filling an inside of the micropattern structure with a desired material according to an example embodiment.

As illustrated in FIG. 3, the micropattern structure is coated with a sacrificial material 30. The sacrificial material 30 wholly covers the substrate 10 and the guide blocks 20. The sacrificial material 30 may form protrusions and depressions in the micropattern structure.

Various organic compounds in which a dissoluble solvent is present may be used as the sacrificial material 30. For example, a polymer material (e.g., polyacrylic acid-based polymer material) that is not dissolved in an organic solvent (PGMEA, propylene glycol monomethyl ether acetate) but dissolved in a TMAH (tetramethyl ammonium hydroxide) aqueous solution after heat treatment may be used as the sacrificial material 30. Moreover, for example, a novolac-based resin used as the photosensitive film, or an organic compound such as PVP (polyvinylphenol), acrylate, a norbornene polymer, polytetrafluoroethylene (PTFE), a silsesquioxane polymer, polymethyl methacrylate (PMMA), a terpolymer, poly (1-butene sulfone) (PBS), a novolac-based positive electron resist (NPR), poly(methyl-a-chloroacrylate-co-a-methyl styrene), poly(glycidyl methacrylate-co-ethyl acrylate), or polychloromethylstyrene (PCMS) may be used as the sacrificial material 30.

Figure 4:
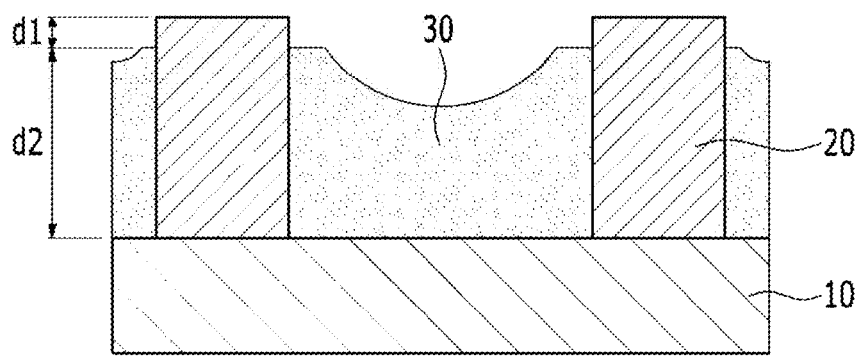

As illustrated in FIG. 4, a portion of the sacrificial material 30 is plasma ashed so as to expose an upper portion of the micropattern structure such that an upper portion of the guide block 20 is exposed. In this case, the degree of ashing, that is, an upper depth d1 of the exposed guide block 20, is determined based upon the desired thickness d2 of the filling material (50 of FIG. 7) to be filled into the micropattern structure. That is, in an ashing process, the thickness d2 of the filling material 50 to be filled in the micropattern structure is determined, and the upper depth d1 of the exposed guide block 20 is determined based on to the thickness d2 of the filling material 50. The process coefficients for the ashing process used to expose the upper portion of the guide block 20 may be calculated based on the desired upper depth d1, so that the upper portion of the guide block 20 is exposed to the upper depth d1.

Figure 5:
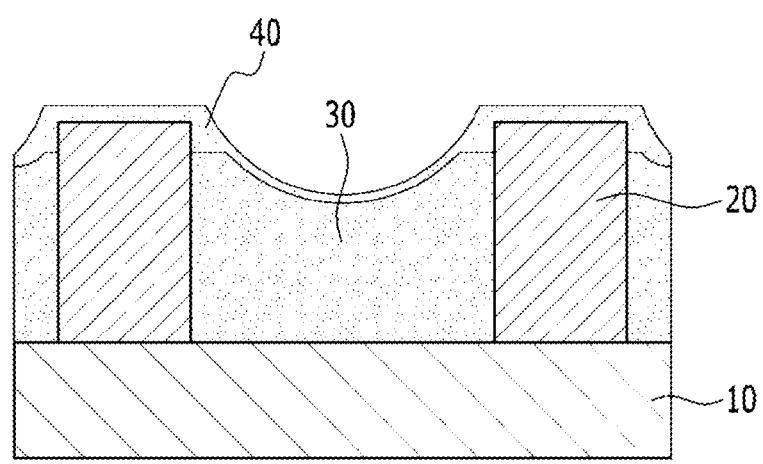

As illustrated in FIG. 5, the micropattern structure, in which the upper portion of the guide block 20 is exposed, is coated with a material having a polarity that is contrary to the polarity that of filling material 50 that is to be filled into the trench between guide blocks 20. For example, in the case where the filling material 50 is a hydrophilic material, the micropattern structure, in which the upper portion of the guide block 20 is exposed, is coated with a hydrophobic material. In the case where the filling material 50 is a hydrophobic material, the micropattern structure, in which the upper portion of the guide block 20 is exposed, is coated with a hydrophilic material.

Hereinafter, it example embodiments are described in which the filling material 50 is a hydrophilic material.

Accordingly, the micropattern structure, in which the upper portion of the guide block 20 is exposed, is coated with a hydrophobic material 40, and the hydrophobic material 40 covers the upper portion of the guide block 20 of the micropattern structure and the sacrificial material 30. If the micropattern structure is coated with the hydrophobic material 40 and then heat treated, the hydrophobic material 40 coming into contact with the upper portion of the guide block 20 is chemically bonded to the upper portion of the guide block 20.

A polymer having hydrophobicity may be used as the hydrophobic material 40. Examples of the hydrophobic material 40 include $RSi(OR')_3$ or RPO(OH), in which R is an aliphatic alkyl group such as CHx or CFx (where x is a natural number between 1 and 3) and R' is a methyl group or an ethyl group. For example, a dimethylsiloxane (polydimethylsiloxane, PDMS) brush in which an OH— group is attached to an end thereof may be used as the hydrophobic material 40.

Figure 6:
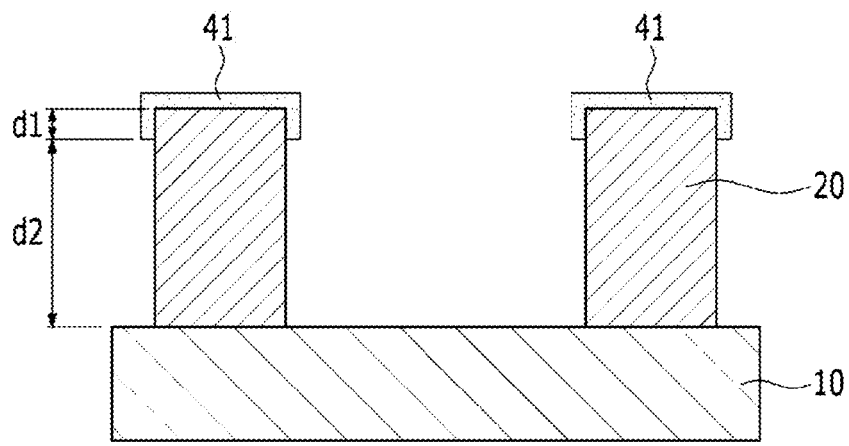

As illustrated in FIG. 6, if the micropattern structure is washed by an organic solvent, the sacrificial material 30 and the excess hydrophobic material 40 that, for instance, is not bonded to the guide blocks 20 are removed by the organic solvent, and a hydrophobic material cap 41 chemically bonded to the upper portion of the guide block 20 remains. That is, the hydrophobic material cap 41 is formed on the upper portion of the guide block 20. The hydrophobic material cap 41 surrounds the upper portion of the guide block 20 down to the upper depth d1.

For example, a TMAH (tetramethyl ammonium hydroxide) aqueous solution may be used as the organic solvent. Moreover, as the organic solvent, for example, MeOH (methanol), PGMEA (propylene glycol monomethyl ether acetate), NMP (N-methyl-2-pyrrolidone), DMSO (dimethyl sulfoxide), or the like may be used according to a kind of the sacrificial material 30 and the hydrophobic material 40.

In the case where $RSi(OR')_3$ or RPO(OH) is used as the hydrophobic material 40, the hydrophobic material 40 may be removed by first washing using MeOH or PGMEA, and the sacrificial material 30 may be removed by second washing using any one of PGMEA, NMP, and DMSO.

Figure 7:
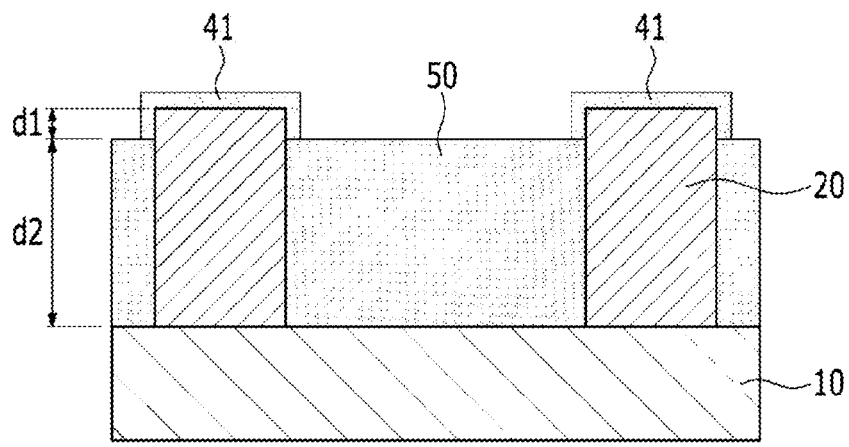

As illustrated in FIG. 7, the micropattern structure is coated with the filling material 50. The filling material 50 may be applied on the micropattern structure by an inkjet. Because the filling material 50 is the hydrophilic material and the upper portion of the guide block 20 is surrounded by the hydrophobic material cap 41, the filling material 50 does not remain on the upper portion of the guide block 20 but is filled only between the guide blocks 20.

In this case, a process coefficient of a coating process is calculated based on a predetermined thickness d2 of the filling material 50. That is, a coating amount of the filling material 50 is determined so that the filling material 50 is filled between the guide blocks 20 by the predetermined thickness d2.

In the course of filling the filling material 50, at an early stage where the filling material 50 is filled between the guide blocks 20 in an amount that is smaller than the predetermined thickness d2, the filling material 50 is filled with a gradient that is convex downwardly due to affinity with the guide blocks 20. That is, the depth of the filling material 50 is initially smaller in a center area in the trench between the guide blocks 20 than along the edges where the filling material 50 contacts the guide blocks 20. The filling material 50 having the gradient that is convex downwardly comes into contact with the hydrophobic material cap 41 by gradually filling the filling material 50 between the guide blocks 20. A portion (edge portion) of the filling material 50, which is in contact with the hydrophobic material cap 41, does not ascend any more due to non-affinity with the hydrophobic material cap 41, and a portion (central portion) of the filling material 50, which is convex downwardly, is thus filled. The portion of the filling material 50, which is convex downwardly, is filled, and finally, the filling material 50 is filled in so that it is level across the top of the filling material 50 between the guide blocks 20 at the predetermined thickness d2.

As described above, the filling material 50 may be filled so that it is level at the desired thickness d2 in the micropattern structure by forming the hydrophobic material cap 41 down to the upper depth d1 for determining the thickness d2 of the filling material 50 on the upper portions of the guide blocks 20 of the micropattern structure by using the material having polarity that is contrary to the polarity of the filling material 50. Further, because the filling material 50 is filled in the micropattern structure without an etching process, there is no worry about degeneration of the filling material 50 by the etching process.

A method of filling an inside of the micropattern structure may be used, for instance, in a process for manufacturing a semiconductor or a process for manufacturing a display device.

Particularly, the method of filling the inside of the micropattern structure may be used in a graphoepitaxy process where a guide pattern is formed, and then a block copolymer is self assembled along the guide pattern by filling the block copolymer.

Hereinafter, a method of forming a nanopattern by self assembling a block copolymer will be described with reference to FIGS. 8 to 10.

Figure 8:
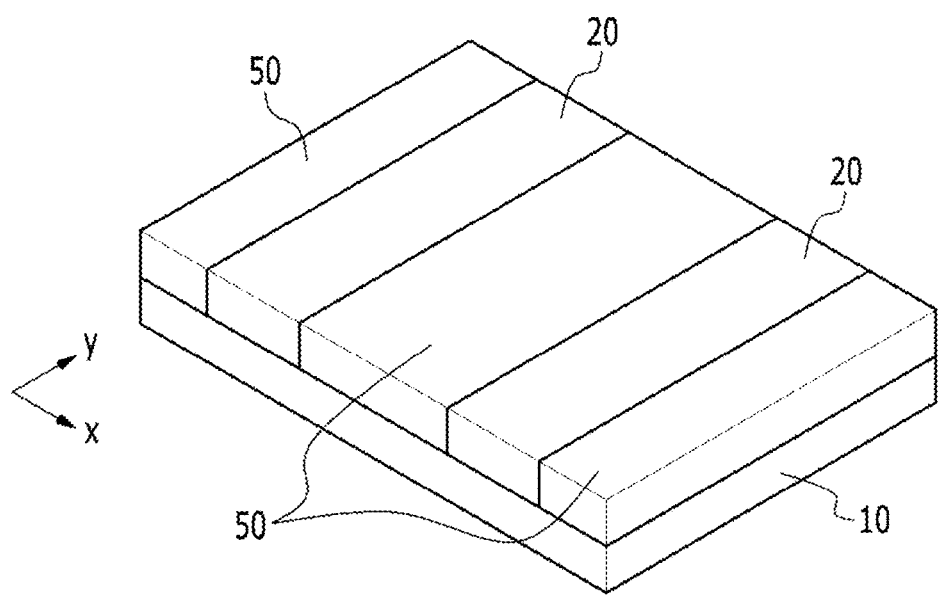
FIGS. 8 to 10 are process perspective views illustrating a method of forming a nanopattern of a block copolymer according to an example embodiment.
Figure 9:
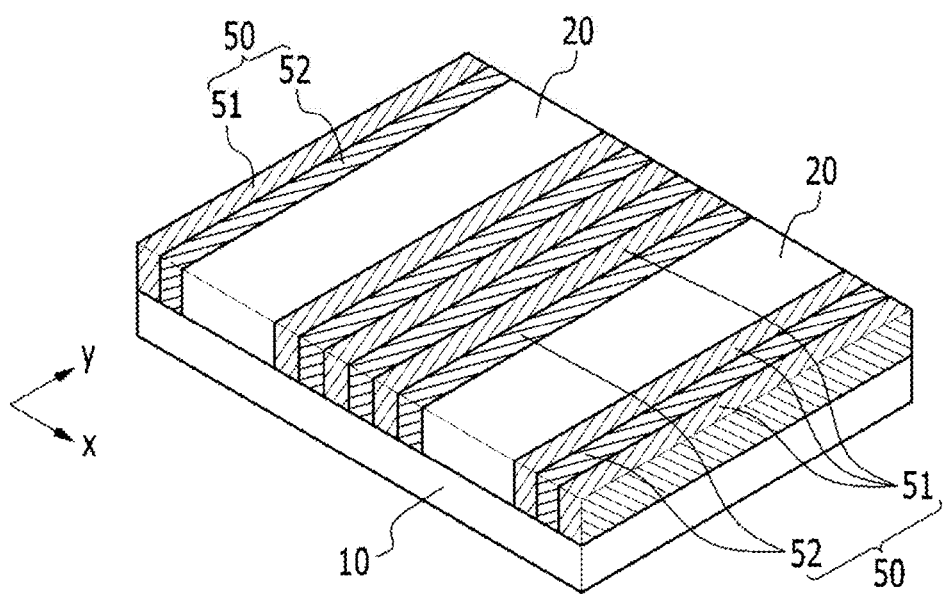
Figure 10:
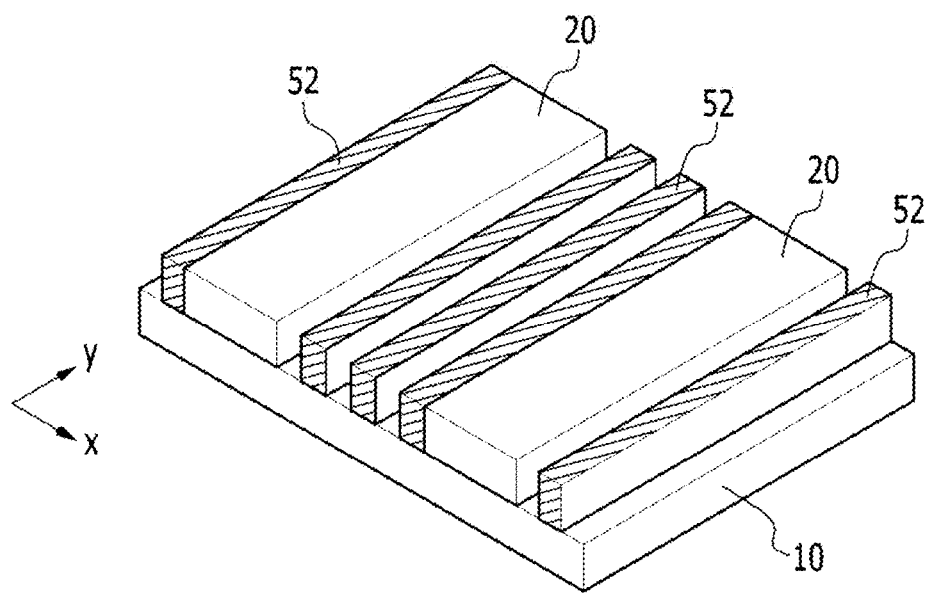

FIGS. 8 to 10 are process perspective views for illustrating the method of forming a nanopattern of block copolymer according to an example embodiment.

As illustrated in FIG. 8, the filling material 50 that includes the block copolymer is filled into the micropattern structure, which structure includes the substrate 10 and the guide block 20 formed on the substrate 10. The filling material 50 may be filled so that it is level across a desired thickness d2 in the micropattern structure by the method illustrated in FIGS. 3 to 7.

Herein, for convenience of description, the filling material 50 is illustrated to be filled to the same thickness as that of height of the guide block 20, and the hydrophobic material cap 41 is not illustrated.

The block copolymer is a polymer where two different kinds of monomers are covalent-bonded. The two different kinds of monomers have different physical and chemical properties. Accordingly, one first monomer has relatively higher hydrophilicity, i.e. is more hydrophilic, as compared to the other second monomer, and the second monomer has relatively higher hydrophobicity, i.e., is more hydrophobic, as compared to the first monomer. The block copolymer may include, for example, polystyrene and a polymer covalent-bonded to polystyrene.

Specific examples of the block copolymer may include, for example, polystyrene-block-poly(methylmethacrylate) (PS-b-PMMA), polystyrene-block-poly(ethylene oxide) (PS-b-PEO), polystyrene-block-poly(vinylpyridine) (PS-b-PVP), polystyrene-block-poly(ethylene-alt-propylene) (PS-b-PEP), polystyrene-block-polyisoprene (PS-b-PI), or the like.

As illustrated in FIG. 9, if the micropattern structure filled with the filling material 50 is heat treated, the filling material 50 undergoes a phase separation into the first block 51 and the second block 52 in the second direction x while being aligned in the first direction y. The first block 51 may include a polymer, and the second block 52 may include polystyrene.

As illustrated in FIG. 10, the first block 51 is selectively removed. For example, if the micropattern structure including the first block 51 and the second block 52 is immersed in a solution including acetic acid and then subjected to sonication, only the first block 51 may be selectively removed. Alternatively, after ultraviolet rays are radiated on the micropattern structure including the first block 51 and the second block 52, only the first block 51 may be selectively removed through reactive ion etching (RIE) by a difference in etching selectivity.

Accordingly, only the guide block 20 and the second block 52 remain on the substrate 10, and the plurality of second blocks 52 form the nanopattern extending in the first direction y in which the guide block 20 extends.

Figure 11:
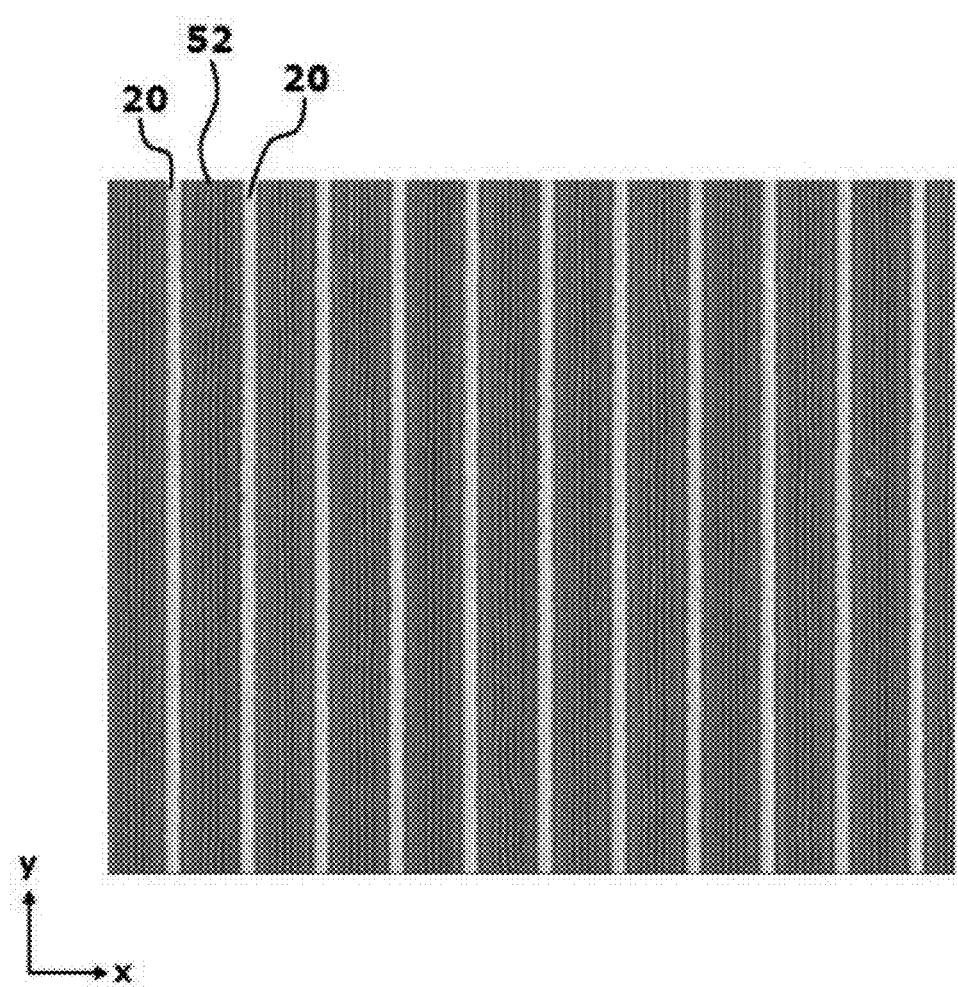
FIG. 11 is an example view illustrating an experimental result obtained by forming the nanopattern of the block copolymer by using a method of filling of the inside of the micropattern structure according to an example embodiment.

FIG. 11 is an example view illustrating an experimental result obtained by forming the nanopattern of the block copolymer by using the method of filling the inside of the micropattern structure according to an example embodiment.

FIG. 11 is the experimental result obtained by filling the micropattern structure with the filling material 50 including the block copolymer so that it is level and then forming the nanopattern by the graphoepitaxy process. It can be seen that the second block 52 is aligned in the first direction y between the guide blocks 20. The degree of alignment of the second block 52 is 97%.

Figure 12:
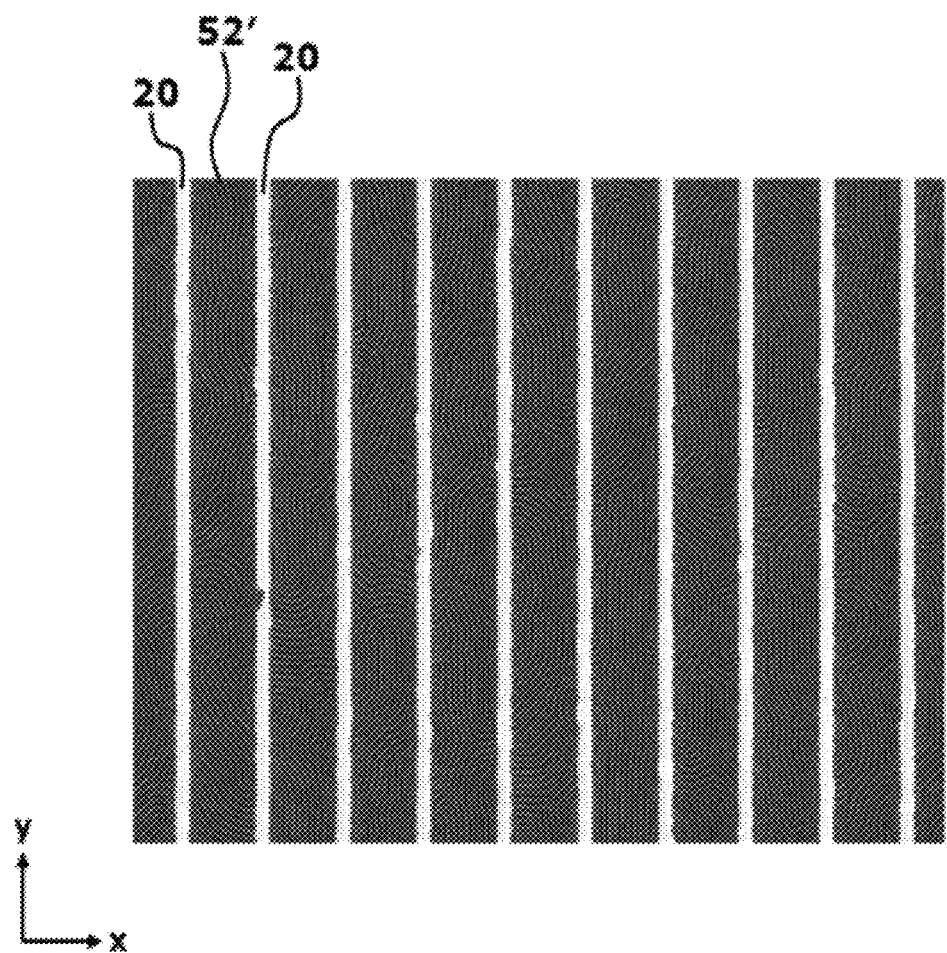
FIG. 12 is an example view illustrating an experimental result obtained by forming the nanopattern of the block copolymer by not using the method of filling the inside of the micropattern structure according to example embodiments.

FIG. 12 is an example view illustrating an experimental result obtained by forming the nanopattern of the block copolymer which was formed without using the method of filling the inside of the micropattern structure according to an embodiment of the present disclosure.

FIG. 12 is the experimental result obtained by filling the filling material 50 including the block copolymer in the micropattern structure in which the hydrophobic material cap 41 is not formed on the guide block 20 of the micropattern structure, and then forming the nanopattern by the graphoepitaxy process. It can be seen that the block copolymer is irregularly aligned by the filling material 50 remaining on the upper portions of the guide blocks 20 when being self assembled, and thus the degree of alignment of a second block 52' is poor and second block 52' is not linear.

In the case where the filling material 50 including the block copolymer is filled in the micropattern structure so that it is level and the nanopattern is then formed by the graphoepitaxy process according to example embodiments, the degree of alignment and linearity of the block copolymer is very excellent.

The nanopattern formed by the graphoepitaxy process may be used, for example, as a mask for forming a polarizer in a process of manufacturing the polarizer included in a liquid crystal display panel.

Figure 13:
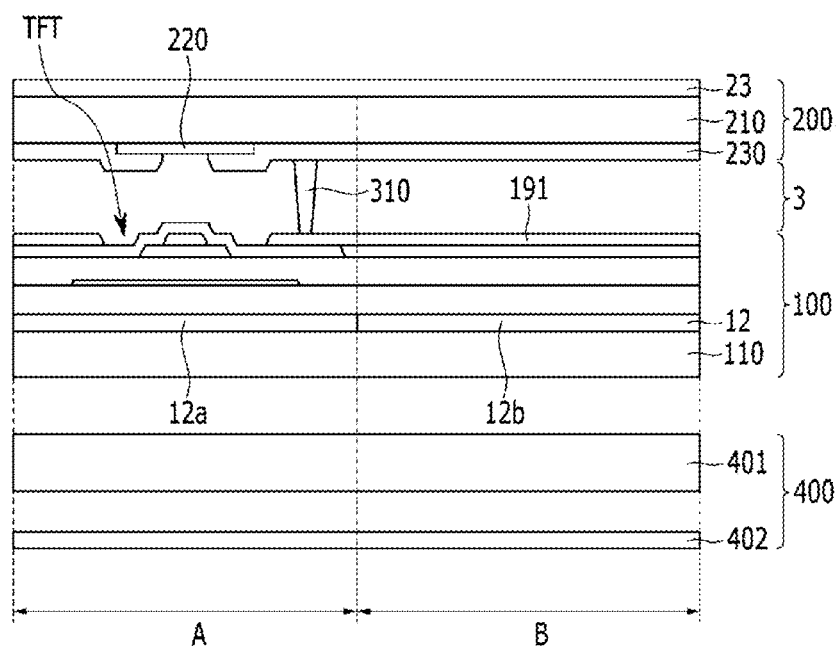
FIG. 13 is a cross-sectional view illustrating an example of a liquid crystal display panel according to an example embodiment.

FIG. 13 is a cross-sectional view of a liquid crystal display according to an example embodiment.

Referring to FIG. 13, the liquid crystal display includes a first display panel 100 and a second display panel 200 that face each other, a liquid crystal layer 3 disposed between the two display panels 100 and 200, and a light source portion 400 disposed outside the two display panels 100 and 200 to supply light to the display panels 100 and 200.

The first display panel 100 includes a first insulation substrate 110 and an optical conversion layer 12 disposed thereon. The optical conversion layer 12 includes a reflection portion 12a reflecting incident light and a polarization portion 12b through which light of the incident light, which is vibrated (oscillates) in a first direction, is transmitted and light vibrated (oscillates) in a second direction that is different from the first direction is reflected. In this case, the first direction and the second direction may be perpendicular to each other.

In one example, the reflection portion 12a of the optical conversion layer 12 is disposed at a position corresponding to the position of a non-opening region A of the liquid crystal display, for example, a region in which signal lines such as a gate line and a data line, a switching element such as a thin film transistor, a black matrix, and the like are disposed, and, in an example, the polarization portion 12b of the optical conversion layer 12 is disposed at a position corresponding to an opening region B of the liquid crystal display, for example, a region in which a pixel electrode is disposed.

An insulating layer 130 is disposed on the optical conversion layer 12, and a plurality of thin films including a thin film transistor (TFT), a pixel electrode 191, and the like are formed on the insulating layer 130.

The second display panel 200 includes a second insulation substrate 210, a polarizer 23 disposed outside the second insulation substrate 210, and a black matrix 220 and a color filter 230 disposed in the second insulation substrate 210.

The polarizer 23 may absorb light vibrated (oscillating) in the first direction, which is transmitted by the polarization portion 12b of the optical conversion layer 12, and may transmit light vibrated (oscillating) in the second direction, which is reflected by the polarization portion 12b of the optical conversion layer 12.

That is, light vibrated in the first direction is transmitted through the polarization portion 12b of the optical conversion layer 12, and light vibrated in the second direction is transmitted through the polarizer 23. In this case, the first direction and the second direction may be perpendicular to each other. Accordingly, a polarization axis of the polarization portion 12b of the optical conversion layer 12 and a polarization axis of the polarizer 23 may be orthogonal to each other.

The light source portion 400 includes a light source 401 supplying light and a reflector 402 disposed outside the light source 401 to increase efficiency of the light source 401.

The liquid crystal layer 3 includes a plurality of liquid crystal molecules (not illustrated). When no electric field is applied to the liquid crystal layer 3, the liquid crystal molecules may be arranged to be vertical or horizontal to a surface of the first substrate 110 or the second substrate 210.

A spacer 310 maintaining an interval between the two display panels 100 and 200 may be disposed between the two display panels 100 and 200.

The insulating layer 130 may be disposed between the optical conversion layer 12 and a thin film structure to prevent generation of parasitic capacitance between the optical conversion layer 12 and the pixel electrode 191 of the thin film structure.

In the liquid crystal display according to an example embodiment, light that is incident from the outside to the liquid crystal layer 3 through the polarizer 23 may pass through the liquid crystal layer 3 and be reflected back to the liquid crystal layer 3 by the reflection portion 12a of the optical conversion layer 12 so as to contribute to displaying an image of the liquid crystal display, and thus in the liquid crystal display, at least a portion of a pixel region may be used as a reflective display region by the reflection portion 12a of the optical conversion layer 12.

In the liquid crystal display according to an example embodiment, at least a portion of the pixel region may be used as the reflective display region, light efficiency of the light source portion may be increased by including the optical conversion layer transmitting light vibrated in a predetermined direction and reflecting light vibrated in the remaining direction to return light back to the light source portion, and light efficiency may be further increased by forming the reflection portion of the reflective display region and the polarization portion for polarization as one layer so as to position the reflection portion and the polarization portion in the non-opening region and the opening region in the pixel region of the liquid crystal display.

Figure 14:
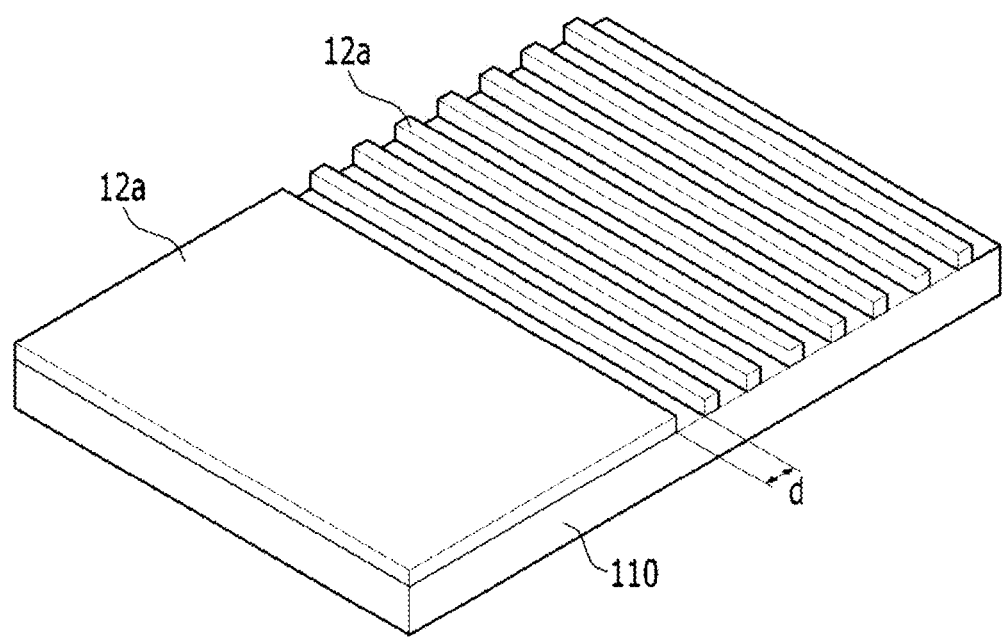
FIG. 14 is a view illustrating an optical conversion layer of a liquid crystal display according to an example embodiment.

FIG. 14 is a view illustrating the optical conversion layer of the liquid crystal display according to an example embodiment.

Referring to FIG. 14, the optical conversion layer 12 includes the reflection portion 12a reflecting incident light and the polarization portion 12b through which light of the incident light, which is vibrated in a first direction, is transmitted and light vibrated in a predetermined direction is reflected.

As illustrated in the drawing, the reflection portion 12a is a metal plate having a predetermined plane shape, and the polarization portion 12b has a shape where fine metal patterns 121 that extend in a predetermined direction are disposed in parallel at regular intervals. An interval d between the fine metal patterns 121 may be about 50 nm to 100 nm. Light vibrated in a length direction where the fine metal pattern 121 of the polarization portion 12b extends is reflected, and light vibrated in a direction that is perpendicular to the length direction where the fine metal pattern 121 extends is transmitted.

The reflection portion 12a and the polarization portion 12b of the optical conversion layer 12 may be simultaneously formed. To be more specific, when forming the optical conversion layer 12 on the first insulation substrate 110, the method of filling the filling material 50 including the block copolymer in the micropattern structure so that it is level as illustrated in FIGS. 3 to 7, and the graphoepitaxy process illustrated in FIGS. 8 to 10 may be used.

A metal layer for forming the optical conversion layer 12 is formed on the first insulation substrate 110. The metal layer may include aluminum, silver, platinum, or the like. The micropattern structure is formed of a plurality of guide blocks 20 on the metal layer. A plurality of guide blocks 20 are formed at a position corresponding to the polarization portion 12b. An etch stopper preventing etching of the metal layer may be formed at a position corresponding to the reflection portion 12a. The first insulation substrate 110 on which the micropattern structure is formed is coated with the sacrificial material 30. A portion of the sacrificial material 30 is ashed to expose the upper portions of a plurality of guide blocks 20. The first insulation substrate 110, on which the upper portions of the plurality of guide blocks 20 are exposed, is coated with the hydrophobic material 40. The first insulation substrate 110 is heat treated to chemically bond the hydrophobic material 40 to the upper portions of a plurality of guide blocks 20. The sacrificial material 30 and the hydrophobic material 40 are removed to form the hydrophobic material cap 41 chemically bonded to the upper portions of the plurality of guide blocks 20. The filling material 50 including the block copolymer is filled between the plurality of guide blocks 20 so as to be level. The first insulation substrate 110 filled with the filling material 50 is heat treated to perform phase separation of the filling material 50 including the block copolymer into the first block 51 and the second block 52 in the second direction while the filling material 50 is aligned in the first direction. Any one of the first block 51 and the second block 52 is selectively removed to form the nanopattern. In this case, the nanopattern is formed in a region corresponding to the polarization portion 12b. In addition, the nanopattern is not formed in the reflection portion 12a. If the metal layer is etched by using the formed nanopattern as a mask, the metal layer forms the optical conversion layer 12 having the nanopattern.

Accordingly, in the liquid crystal display according to an example embodiment, a reflection region and a transmission region can be implemented in each pixel of the liquid crystal display and the polarization portion serving as the polarizer of the transmission region can be formed by directly forming the optical conversion layer 12 including the reflection portion 12a and the polarization portion 12b on the substrate, and thus a manufacturing process is simple, and a manufacturing cost can be reduced because the number of absorptive polarizers is reduced.

Further, the liquid crystal display according to an example embodiment includes the optical conversion layer 12 including the reflection portion 12a reflecting incident light and the polarization portion 12b reflecting at least a portion of incident light, and thus light emitted from the light source portion 400 and reaching the reflection portion 12a of the optical conversion layer 12 via the substrate is reflected by the reflection portion 12a, light of light emitted from the light source portion 400 and reaching the polarization portion 12b of the optical conversion layer 12, which is vibrated in a predetermined direction, is transmitted and continuously progresses, and light vibrated in the remaining direction is reflected to be returned back to the light source portion 400 and then reflected again on the reflector 402 to be incident again on the substrate 110. Accordingly, efficiency of light emitted from the light source portion 400 is increased.

The above-referenced drawings and the detailed description are only illustrative, which are used for the purpose of describing but are not used to limit a range of the present invention. Therefore, it will be understood by those skilled in the art that various modifications and other equivalent exemplary embodiments may be possible.

<Description of symbols>

| | |
|---|---|
| 10: Substrate | 20: Guide block |
| 30: Sacrificial material | 40: Hydrophobic material |
| 41: Hydrophobic material cap | 50: Filling material |
| 51: First block | 52: Second block |

What is claimed is:

1. A method of forming a micropattern structure, comprising:
   coating a structure including a plurality of guide blocks extending in a first direction on a substrate and disposed to be spaced apart from each other in a second direction, which is perpendicular to the first direction, with a sacrificial material;
   ashing a portion of the sacrificial material to expose upper portions of the plurality of guide blocks;
   coating the structure with a first material having a polarity that is contrary to a polarity of a filling material to be filled in the structure;
   heat-treating the structure to chemically bond the first material to the upper portions of the plurality of guide blocks;
   removing the sacrificial material and excess first material to form a first material cap chemically bonded to the upper portions of the plurality of guide blocks; and
   filling the structure with the filling material.

2. The method of claim 1, wherein:
the sacrificial material comprises:
an organic compound dissolved in a solvent.

3. The method of claim 2, wherein:
ashing the portion of the sacrificial material to expose the upper portions of the plurality of guide blocks comprises:
determining a predetermined thickness of the filling material;
determining an upper depth to expose the plurality of guide blocks based on the predetermined thickness of the filling material; and
exposing the upper portions of the plurality of guide blocks to the upper depth.

4. The method of claim 3, wherein:
the first material includes:
a hydrophobic material.

5. The method of claim 4, wherein:
the hydrophobic material is any one of $RSi(OR')_3$ and $RPO(OH)$,
R is an aliphatic alkyl group, and R' is a methyl group or an ethyl group.

6. The method of claim 4, wherein:
removing the sacrificial material and excess hydrophobic material to form the first material cap chemically bonded to the upper portions of the plurality of guide blocks comprises:
performing a first washing using a first organic solvent to remove the hydrophobic material; and
performing a second washing using a second organic solvent to remove the sacrificial material.

7. The method of claim 3, wherein:
filling the structure with the filling material comprises:
filling the filling material between the plurality of guide blocks to the predetermined thickness of the filling material.

8. The method of claim 1, wherein:
the filling material comprises a block copolymer.

9. The method of claim 8, further comprising:
heat-treating the structure filled with the filling material including the block copolymer.

10. The method of claim 9, wherein:
heat-treating the structure filled with the filling material including the block copolymer to phase separate the filling material including the block copolymer into a first block and a second block in the second direction while the filling material is aligned in the first direction.

11. The method of claim 10, further comprising:
selectively removing any one of the first block and the second block to form a nanopattern.

12. A method of forming a nanopattern, comprising:
filling a filling material including a block copolymer into a micropattern structure, the micropattern structure including a plurality of guide blocks disposed on a substrate and having upper portions opposite the substrate, wherein the upper portions are surrounded by a hydrophobic material cap to a predetermined upper depth;
heat-treating the micropattern structure filled with the filling material including the block copolymer to phase separate the filling material including the block copolymer into a first block and a second block in a second direction while the filling material is aligned in a first direction; and selectively removing any one of the first block and the second block to form a nanopattern.

13. The method of claim 12, wherein:
the plurality of guide blocks extend in the first direction on the substrate and are disposed to be spaced apart from each other in the second direction that is perpendicular to the first direction.

14. The method of claim 12, wherein:
filling the filling material including the block copolymer in the micropattern structure comprises:
filling the filling material into the micropattern structure to a thickness of the filling material determined to correspond to a depth from the predetermined upper depth to the substrate, and an upper surface of the filling material at the predetermined upper depth is level.

15. A method of manufacturing a display panel for a liquid crystal display, comprising:
forming a metal layer on a first insulation substrate;
forming a plurality of guide blocks on the metal layer;
coating the first insulation substrate, on which the plurality of guide blocks are formed, with a sacrificial material;
ashing a portion of the sacrificial material to expose upper portions of the plurality of guide blocks;
coating the first insulation substrate, on which the upper portions of the plurality of guide blocks are exposed, with a hydrophobic material;
heat-treating the first insulation substrate to chemically bond the hydrophobic material to the upper portions of the plurality of guide blocks;
removing the sacrificial material and excess hydrophobic material to form a hydrophobic material cap chemically bonded to the upper portions of the plurality of guide blocks;
filling a filling material including a block copolymer between the plurality of guide blocks;
heat-treating the first insulation substrate filled with the filling material to form a nanopattern; and
etching the metal layer by using the nanopattern as a mask to form an optical conversion layer.

16. The method of claim 15, wherein:
the plurality of guide blocks extend in a first direction and are spaced apart from each other in a second direction that is perpendicular to the first direction, and the filling material including the block copolymer undergoes a phase separation into a first block and a second block in the second direction while being aligned in the first direction.

17. The method of claim 16, wherein:
the heat-treating of the first insulation substrate filled with the filling material to form the nanopattern comprises
selectively removing any one of the first block and the second block.

18. The method of claim 15, wherein:
the optical conversion layer includes a reflection portion reflecting incident light and a polarization portion through which light vibrated in the first direction is transmitted, and
the plurality of guide blocks are formed at a position corresponding to the polarization portion.

\* \* \* \* \*